United States Patent
Kazemizadeh et al.

(10) Patent No.: US 10,577,493 B2
(45) Date of Patent: Mar. 3, 2020

(54) PHTHALATE-FREE, EPOXIDIZED PLASTICIZER COMPOSITIONS COMPRISING FATTY ACID ESTERS AND BIO-BASED OILS, AND METHODS OF MAKING THE SAME

(71) Applicant: Arkema Inc., King of Prussia, PA (US)

(72) Inventors: Mohammad R. Kazemizadeh, Blooming Prairie, MN (US); Cecile N. Bonnet, Philadelphia, PA (US)

(73) Assignee: Arkema Inc., King of Prussia, PA (US)

( * ) Notice: Subject to any disclaimer, the term of this patent is extended or adjusted under 35 U.S.C. 154(b) by 106 days.

(21) Appl. No.: 16/066,313

(22) PCT Filed: Jan. 11, 2017

(86) PCT No.: PCT/US2017/012921
§ 371 (c)(1),
(2) Date: Jun. 27, 2018

(87) PCT Pub. No.: WO2017/123578
PCT Pub. Date: Jul. 20, 2017

(65) Prior Publication Data
US 2019/0002681 A1    Jan. 3, 2019

Related U.S. Application Data

(60) Provisional application No. 62/278,079, filed on Jan. 13, 2016.

(51) Int. Cl.
| | |
|---|---|
| *C08L 27/04* | (2006.01) |
| *C08L 27/06* | (2006.01) |
| *C08K 5/103* | (2006.01) |
| *C08L 67/02* | (2006.01) |

(52) U.S. Cl.
CPC .............. *C08L 27/04* (2013.01); *C08K 5/103* (2013.01); *C08L 27/06* (2013.01); *C08L 67/025* (2013.01)

(58) Field of Classification Search
CPC ........ C08L 27/04; C08L 27/06; C08L 67/025; C08K 5/103
USPC ......................................................... 524/317
See application file for complete search history.

(56) References Cited

U.S. PATENT DOCUMENTS

| | | |
|---|---|---|
| 3,196,119 A | 7/1965 | Boller et al. |
| 8,557,139 B2 | 10/2013 | Eaton |
| 2012/0085568 A1 | 4/2012 | Eaton |
| 2012/0129746 A1 | 5/2012 | Benecke et al. |
| 2013/0203907 A1 | 8/2013 | Kazemizadeh |
| 2014/0235769 A1* | 8/2014 | Mundra ............... C08J 3/203 524/109 |
| 2015/0240050 A1 | 8/2015 | Roa et al. |
| 2015/0368431 A1 | 12/2015 | Gosh-Dastidar et al. |

FOREIGN PATENT DOCUMENTS

| | | |
|---|---|---|
| WO | WO 2014/130391 A1 | 8/2014 |
| WO | 14135366 A1 | 9/2014 |

* cited by examiner

*Primary Examiner* — William K Cheung
(74) *Attorney, Agent, or Firm* — Lynn B. Morreale

(57) ABSTRACT

There is disclosed a phthalate-free, epoxidized plasticizer composition comprising a blend of: a) one or more fatty acid esters having less than 10% saturates; and b) one or more bio-based oil having an oxirane value of at least 5.0%. There is also disclosed a method of making a phthalate-free, epoxidized plasticizer composition comprising forming a blend of the fatty acid esters bio-based oils, wherein the one or more fatty acid esters and the bio-based oils are epoxidized either prior to forming the blend or in a single epoxidation step after the blend is formed. Plasticized composition containing the phthalate-free, epoxidized plasticizer composition, as well as articles made from such compositions are also disclosed.

28 Claims, No Drawings

PHTHALATE-FREE, EPOXIDIZED PLASTICIZER COMPOSITIONS COMPRISING FATTY ACID ESTERS AND BIO-BASED OILS, AND METHODS OF MAKING THE SAME

CROSS-REFERENCE TO RELATED APPLICATION

This application is related to and claims the benefit of U.S. Provisional Application No. 62/278,079 filed on Jan. 13, 2016, titled PHTHALATE-FREE, EPOXIDIZED PLASTICIZER COMPOSITIONS COMPRISING FATTY ACID ESTERS AND BIO-BASED OILS, AND METHODS OF MAKING THE SAME; the contents of which are incorporated herein by reference in their entirety for all purposes.

This application is a national stage application under 35 U.S.C. § 371 of PCT/US2017/012921 filed Jan. 11, 2017, which claims benefit to U.S. patent application Ser. No. 62/278,079, filed Jan. 13, 2016.

FIELD OF THE INVENTION

The present disclosure generally relates to phthalate-free, epoxidized plasticizer compositions comprising a blend of one or more fatty acid esters and one or more bio-based oils, and methods of making the same. The present disclosure also relates to plasticized compositions comprising the phthalate-free, epoxidized plasticizer compositions, as well as products made from such plasticized polymers.

BACKGROUND OF THE INVENTION

One of the most commonly used polymers is polyvinyl chloride (PVC). The rigid properties and high chemical resistance associated with the unplasticized form of this vinyl halide polymer has led to its commercial success in a variety of applications, such as pipes and other plumbing supplies. However, there are many other applications that require PVC to be more flexible, which can be achieved by adding a plasticizer to the PVC. Plasticized PVC finds application in a variety of products, including, for example, films, sheeting, wire and cable coverings.

To date, the majority of PVC plasticizers have been petroleum-derived phthalates, such as dioctyl phthalate and diisononyl phthalate. However, such plasticizers can have a variety of drawbacks, including their price as well as the health and environmental concerns associated with their use.

As a result, there is a need for effective "green" plasticizers for thermoplastics and other polymers that are not based on or contain phthalate plasticizers. Prior art describes the use of alkyl ester of epoxidized vegetable oil as a replacement of phthalate in PVC formulation. These epoxide alkyl esters are produced by various epoxidation processes of bio diesel or by trans-esterfication of epoxidized vegetable oils. Typically most vegetable oils, for example soybean oil or bio diesel obtained from soybean oil, contain about 20% saturate fatty acid esters. These saturated fatty acid esters have no epoxy function to act as an acid scavenger in PVC formulations. In addition, they contribute to the release of fumes during extrusion and after formation of film. They also can migrate to the surface of film causing an oily surface, which is not desirable.

To avoid these problems, the Inventors have surprisingly discovered that improved plasticizer properties can result when the individual components used to make the plasticizer composition are selected and engineered to meet certain criteria. For example, fatty acid esters having a low saturation level can allow the resulting composition to exhibit desired volatility properties. The Inventors have shown that, for example, saturate esters and any other volatile components can be removed by steam stripping or under vacuum fraction distillation after the epoxidation step is completed. Alternatively, they can be removed from bio diesel prior to the epoxidation step under full or partial vacuum to solve the fuming during extrusion and migration to the surface of the film. The Inventors have also discovered that the use of fatty acid esters with reduces saturates, coupled with the use of bio-based oils having high oxirane values, lead to a plasticizer with desirable properties.

SUMMARY OF THE INVENTION

In one embodiment there is disclosed a phthalate-free, epoxidized plasticizer composition comprising a blend of a) one or more fatty acid esters having less than 10% saturates, and one or more bio-based oil having an oxirane value of at least 3.0% and preferably of at least 5.0%.

In another embodiment there is disclosed a method of making a phthalate-free, epoxidized plasticizer composition. In an embodiment, the method comprises forming a blend of one or more fatty acid esters having less than 10% saturates, and one or more bio-based oil having an oxirane value of at least 3.0%, and preferably of at least 5.0%, wherein the one or more fatty acid esters and the bio-based oils are epoxidized either prior to forming the blend or in a single epoxidation step after the blend is formed.

In another embodiment there is disclosed a plasticized polymer composition comprising one or more polymers and at least one plasticizer homogeneously dispersed within the polymer composition, wherein the plasticizer is phthalate-free and comprising a blend of: a) one or more fatty acid esters having less than 10% saturates; and b) one or more bio-based oil having an oxirane value of at least 3%, and preferably of at least 5.0%.

In yet another embodiment there is disclosed articles of manufacture comprising a plasticized polymer composition comprising a polyvinyl chloride polymer (PVC) chosen from PVC homopolymers, PVC copolymers, polyvinyl dichlorides (PVDC), and polymers of vinylchloride with vinyl, acrylic and other co-monomers; and at least one plasticizer homogeneously dispersed within the polymer composition, wherein the plasticizer is phthalate-free and comprising a blend of: a) one or more fatty acid esters having less than 10% saturates; and b) one or more bio-based oil having an oxirane value of at least 3.0%, and preferably of at least 5.0%.

It is to be understood that both the foregoing general description and the following detailed description are exemplary and explanatory only and are not restrictive of the invention, as claimed.

DETAILED DESCRIPTION OF THE INVENTION

Epoxidized vegetable oil typically contain 4 up to 30% saturated alkyl esters. In soy bean oil methyl ester epoxide, the saturated esters are methyl palmate and methyl stearate in amounts up to 20%. These esters are not compatible with PVC as compared to other esters in the soy methyl epoxy esters that have epoxy function. In particular, it has been discovered that volatile compounds formed during epoxidation may stay with the epoxidized oil. Even in trace amounts, these volatile compounds, which comprise mainly short chain aldehyde, ketone and hydrocarbons having 2 to 11 carbons cleaved from fatty esters epoxide, and also naturally present saturated fatty esters such as palmate and stearate, may cause unwanted properties in the final PVC product, such as seeping from the film and leaching if the film comes in contact with solvent or other oils. The migration of these saturated alkyl esters to the surface of PVC is not desired for a variety of reasons, including because it makes surface of the film oily.

Without being bound by any theory, it is believed that saturated alkyl esters are not compatible with PVC and lead to the foregoing problems because they do not have oxirane functionally. Thus, these esters are less polar compared to esters containing epoxy functions. As a result, saturated alkyl esters will have more potential to migrate to surface of film. The Inventors have discovered that by removing saturate esters from the mixture, the epoxide mixture is more compatible, and will reduce the fusibility of PVC, which will lower energy consumption during process.

As a result of the problems associated with highly saturated alkyl esters and lower than desired oxirane functionality, the Inventors developed a phthalate free composition that is comprised of a blend of a) one or more fatty acid esters; and b) one or more bio-based oils. The fatty acid esters described herein generally have less than 10% by weight saturates, and the bio-based oils generally have an oxirane value of at least 3.0%. The ratio between the fatty acid esters to the bio-based oils in the blend can range from 90:10 to 10:90, such as from 80:20 to 20:80, from 75:25 to 25:75, from 70:30 to 30:70, from 65:35 to 35:65, from 60:40 to 40:60, from 55:45 to 45:55, and from 50:50.

As used herein, the fatty acid esters may be referred to as "low saturated fatty acid esters," which is defined as having less than 10 weight % saturates, such as less than 8 weight % saturates, less than 7 weight % saturates, or even less than 6 weight % saturates. In one embodiment, the saturate amounts range from 6 to 10 weight %. These fatty acid esters derived from one or more vegetable oils, and can include soy methyl ester, canola methyl ester, or combinations thereof.

In various embodiments, the low saturated fatty acid esters comprises methyl ester derived from high linoleic soy bean oil, methyl ester derived from low saturated soy bean oil, methyl ester derived from high oleic canola oil, low erucic rapeseed, high oleate canola oil, other vegetable oils, or combinations thereof.

The bio-based oils that can be used in the disclosed plasticizer composition, such oils may comprise vegetable oils chosen from soybean oil, olive oil, peanut oil, cottonseed oil, linseed oil, sunflower oil, canola oil, corn oil or combinations thereof.

In one embodiment, the bio-based oil used in the disclosed plasticizer composition has an oxirane value of at least 5%, such as at least 6%, at least 7%, at least 8%, at least 9%, and at least 10%. In one embodiment, the bio-based oil has an oxirane value ranging from 5 to 9%. Further embodiments are directed to epoxidized soybean oils having an oxirane value ranging from 7 to 9%.

The fatty acid ester(s) and bio-based oil(s) can be blended together by means known in the art. The blending can occur at any time before the epoxidation reaction, but is generally done just prior to epoxidation, and in the reaction vessel in which epoxidation will occur. In one embodiment the two oils are metered into a reactor in the selected weight ratio, and admixed with heating to the reaction temperature of 60-80° C. to form a homogeneous admixture. Since the fatty acid ester(s) and bio-based oil(s) are blended before and during the epoxidation reaction, the resulting composition is well homogenized, even for reactants of different weights and viscosities.

Epoxidation of the homogeneous blend can occur by any method known in the art. In one embodiment, the desired ratio of one or more fatty acid esters and one or more bio-based oils are admixed to form a blend. Other additives, such as solvents, and additives to enhance the epoxidation reaction may be added to the blend prior to or during epoxidation. The blend is heated to the desired temperature for epoxidation (60-80° C.) and reactants are fed/added to the blend to carry out the epoxidation.

In one embodiment, a solvent such as toluene or xylene may optionally be added to the blend of fatty acid esters and bio-based oils to aid the quality of the final epoxide and to ease the processing. An organic acid such as formic, acetic or propionic acid may be added to the blend to aid in processing. An inorganic acid such as sulfuric acid may also be optionally added to the blend in order to increase the epoxidation rate. The blend is heated to the desired temperature and then $H_2O_2$ is slowly added to the blend. As this reaction is exothermic, it is controlled by cooling and by regulating the addition rate of $H_2O_2$. Measuring the iodine value of the oil can be used to monitor the progress of the reaction. For example, when the iodine value ranges from 1 to 3, the desired epoxidation level is typically achieved. At his point, the aqueous phase can be separated by gravity and the oil phase can be washed to remove any residue of hydrogen peroxide and acid. This oil phase can then be stripped under vacuum to remove the moisture, organic acid or any solvents.

In one embodiment, methyl oleate is blended with vegetable oil, such as soybean oil, prior to epoxidation. In other embodiments, the blend contains methyl soyate and a vegetable oil such as soybean oil.

One advantage of the process described herein is that in the epoxidation of a blend containing vegetable oil or soy methyl ester and vegetable oil (in form of triglyceride), the vegetable oil or soy methyl ester acts as a solvent for epoxidation of the vegetable oil. This reduces the need of a separate organic solvent, such as toluene, that must be used to reduce the viscosity of the vegetable oil as it is converted to the epoxide and permits subsequent phase separation and washing. The use of less organic solvent provides a variety of benefits including a safer, greener process (less or no organic solvent waste), and a product with less contamination. The elimination of the solvent also creates a more economical process requiring fewer steps, improving throughput of epoxidation processes.

The epoxidized composition of the present disclosure may also be free of traces of alkaline metals (e.g., Na, Ca, and/or Mg ions) found in commercial epoxides, since the use of alkyl ester or soy methyl ester in the blend enables one to wash the final epoxide with water, rather than the alkaline salts used to remove traces of acids in a commercial process. Additionally, the composition of the present disclosure can be free of hydroxyl acetate by-products, and sulfated epoxidized oil found in blends of the separately epoxidized blend components.

In one embodiment, the low saturated fatty acid esters and the bio-based oil are unepoxidized prior to forming the blend. Thus, a single epoxidation step is performed on the resulting blend. In another embodiment, the low saturated fatty acid esters and the bio-based oil are epoxidized prior to forming the blend. In this embodiment, the low saturated fatty acid esters and the bio-based oil are separately epoxidized and then mixed together to form a blend. This embodiment is useful when a commercially available, epoxidized biodiesel is used. In either embodiment, the epoxidation process(es) can be extended in order to achieve a desired ring opening structure for the epoxidized components. For example, the epoxidation process of soybean oil or a fatty acid methyl ester (FAME), or a blend of both, can be extended to open the ring to form hydroxyl alkyl. The formation of hydroxyl alkyl can be achieved by using an extended period of agitation during the epoxidation reaction, such as at least 3 hours, and in certain embodiments 6 to 12 hours. This will improve the resulting plasticizers compatibility with PVC, will reduce migration to the surface of the film and improve volatility. Alternatively, increasing the hydroxyl can be achieved directly by an epoxidation process of FAME or soybean oil and then a transesterification of the high hydroxyl soybean oil epoxide to its methyl ester epoxide.

As previously mentioned, soybean oil or bio diesel obtained from soybean oil contain about 20% saturate fatty acid esters. These saturated fatty acid esters have been shown to negatively impact the resulting plasticized polymer because they have no epoxy function to act as acid scavenger in PVC formulation, they contribute to release of fume during extrusion and after formation of film, and they migrate to the surface of film. To remove these saturated esters and any other volatile components, the Inventors have used, for example, a steam stripping or under vacuum fraction distillation after the epoxidation step is completed. Also, saturated esters present in epoxidized vegetable oil can be extracted by hydrocarbon such as butane, pentane or hexane. Alternatively, the Inventors have shown that these unwanted components can be removed from bio diesel prior to epoxidation step under full vacuum. The ability to be able to control the levels of these unwanted components allow flexibility in the processing steps. For example, in one embodiment, the disclosed method of making a phthalate-free, epoxidized plasticizer composition comprises a) determining the saturation level of one or more fatty acid esters; b) selecting for use a fatty acid esters having an acceptably low saturation level; c) determining the oxirane % and hydroxyl value of one or more one bio-based oil; d) selecting for use a bio-based oil having an acceptable oxirane% and hydroxyl value; e) forming a blend comprising one or more of the selected fatty acid esters and one or more of the selected bio-based oils.

In this embodiment, if the saturation level of one or more fatty acid esters is determined to be too high, such as having more than 10% by weight saturates, these saturate esters and any other volatile components can be removed by steam stripping or under vacuum fraction distillation after epoxidation step is completed.

The same is true for the biodiesel. It is understood that volatile components can be removed from bio diesel prior to epoxidation step under full vacuum to solve the fuming during extrusion and migration to the surface of the film.

There is also disclosed a plasticized polymer composition comprising one or more polymers and at least one plasticizer homogeneously dispersed within the polymer composition, wherein the plasticizer comprises the epoxidized plasticizer composition described herein. For example, a plasticized polymer composition described herein may include one or more polymers chosen from halogenated polymers, acid-functionalized polymers, anhydride-functionalized polymers, and nitrile rubbers.

In one embodiment, the polymer is a polyvinyl chloride polymer (PVC) chosen from PVC homopolymers, PVC copolymers, polyvinyl dichlorides (PVDC), and polymers of vinylchloride with vinyl, acrylic and other co-monomers. In another embodiment, the plasticized polymer composition described herein comprises one or more bio-polymers chosen from polylactic acid, polyhydroxy butyrate, polyamide 11 or mixtures thereof.

The plasticizer composition described herein may be present in the polymer composition in an amount up to 40 weight percent, based on the total amount of polymer, such as an amount ranging from 1 to 40 percent, from 1 to 30 percent, from 1 to 25 percent, from 1 to 20 percent, from 5 to 30 percent, from 5 to 25, from 5 to 20 percent, 10 to 30 percent, from 10 to 25, and from 10 to 20 percent, all based on the weight of a polymer composition.

The plasticized polymer compositions described in the present disclosure can be formulated in a conventional manner, including various kinds of additives in addition to the epoxidized fatty acid esters of natural fats or oils. In various embodiments, the plasticized polymer composition may further comprise one or more adjuvants chosen from one or more fillers, pigments, flame retardants, dyes, stabilizers, UV stabilizers, lubricants, surfactants, flow aids, plasticizers or combinations thereof.

A non-limiting example of a typical flexible PVC formulation described herein comprises:
  100 phr of a high K value resin (vinyl resin);
  30-120 phr of alkyl ester of epoxidized vegetable oil (loading of plasticizer depends on flexibility required for variety of applications);
  0-5 phr of Epoxidized Soybean Oil (co-stabilizer and plasticizer); and
  1-5 phr of Heat Stabilizer, such as a barium/zinc stabilizer.

The flexible PVC products made from the above formulation can be fabricated through a multi-step process, which may include the following. A pre-mixture of the PVC formulation is mixed before being converted to the final product by heating briefly to the fusion temperature and then cooling. Fused test samples 80 mils thick are typically produced for most of the testing. The following properties are generally measured on the plasticized PVC to evaluate the useful of the material: hardness, modulus of flexibility, low temperature flexibility and volatility. Non-limiting examples of properties for different plasticizers described herein are shown in the Examples and Table that follow.

EXAMPLES

Three different plasticizer were produced, and these plasticizers were then used form three different compositions, each containing a high molecular weight homopolymer dispersion resin (Formolon NVA), 40 parts plasticizer per hundred resin, 3 parts epoxidized soybean oil per hundred resin, and 2 parts barium/zinc heat stabilizer.

Plasticizer 1: Methyl ester canola oil epoxide, formed by combining epoxidized Canola oil from formic acid and acetic acid epoxidation process, and then trans-esterification to form the methyl ester. The fatty acid comprised 6.2% saturates, 81.6% epoxide of (C18:1, 9.6% C18:2, 1.1% C18:3)

Plasticizer 2: Methyl Esters epoxide made from Low Saturate soybean oil, formed by formic acid epoxidation of Low Saturate soybean oil and then trans-esterification to form the methyl ester epoxide. The fatty acid of this epoxide comprised 7.0% saturates, 24.5% C18:1, 58.7% C18:2, 8.3% C18:3 epoxide.

Plasticizer 3: Methyl Esters epoxide made from High Linoleic soybean oil, formed by formic acid epoxidation of high linoleic soybean oil, and then trans-esterification to from the methyl ester epoxide. The fatty acid of this epoxide comprised of 7.6% saturates, 25.8% C18:1, 58.5% C18:2, 3.6% C18:3 epoxide.

Plasticizer 4: Soy Methyl Esters epoxide with saturate removed, formed by formic acid epoxidation of soybean oil, and then trans-esterification to form the methyl ester epoxide. The saturates are then removed under vacuum. The fatty acid of this epoxide comprised of 1.4% saturates, 20.4% C18:1, 65.4% C18:2, 6.3% C18:3 epoxide.

The properties of the resulting PVC composition are set forth in Table 1.

TABLE 1

FLEXIBLE PVC APPLICATIONS

| Plasticizer | Mechanical properties | | | | | Volatility 24 h | |
|---|---|---|---|---|---|---|---|
| | Hardness shore A | Tensile strength (psi) | Elongation (%) | 100% Modulus | Brittleness Temp (C.) | 100 C. Weight loss % | Specific gravity Sg |
| Plasticizer 1 | 73 | 2855 | 372 | 1178 | −48 | −2.77% | 1.22 |
| Plasticizer 2 | 75 | 3058 | 367 | 1184 | −36 | −2.53% | 1.247 |
| Plasticizer 3 | 75 | 2999 | 364 | 1163 | −41 | −2.85% | 1.246 |
| Plasticizer 4 | 74 | 3102 | 374 | 1169 | −34 | −1.39% | 1.249 |

Example for removing saturate methyl esters from soy methyl ester epoxide:
Place 500 grams soy methyl ester epoxide in a 1 liter 3 necks flask that is equipped with agitator, thermometer and a distillation column head. Connect the set up to a condenser, receiver and vacuum pump system and then start heating the content of flask under full vacuum. Monitor the vapor and pot temperature. Collect all the vapor up to 140-150 C, at this point the pot temperature would be 185-195 C. The starting soy methyl ester epoxide had the following analysis:
Methyl palmate (C16: 0) 15.1%)
Methyl stearate (C18: 0) 5.1%
Methyl oleate epoxide (C18:1 O) 22.9%
Methyl linoleate epoxide (C18:2 O) 50.2%
Methyl linolenate epoxide (C18:3 O) 3.9%
Oxirane 6.4%
After removing saturated methyl ester the pot had the following GC analysis
Methyl palmate (C16: 0) 0.14%)
Methyl stearate (C18: 0) 1.3%
Methyl oleate epoxide (C18:1 O) 20.4%
Methyl linoleate epoxide (C18:2 O) 65.4%
Methyl linolenate epoxide (C18:3 O) 6.3%
Oxirane 7.53%.

What is claimed is:

1. A phthalate-free, epoxidized plasticizer composition comprising a blend of:
   a) one or more fatty acid esters having less than 10% saturates; and
   b) one or more bio-based oil having an oxirane value of at least 5%.

2. The composition of claim 1, wherein the fatty acid esters are derived from one or more vegetable oils.

3. The composition of claim 2, wherein the fatty acid esters comprise soy methyl ester, canola methyl ester, or combinations thereof.

4. The composition of claim 2, wherein the fatty acid esters comprise methyl ester derived from high linoleic soy bean oil, methyl ester derived from low saturated soy bean oil, methyl ester derived from high oleic canola oil, or combinations thereof.

5. The composition of claim 1, wherein the bio-based oils comprise vegetable oils chosen from soybean oil, olive oil, peanut oil, cottonseed oil, linseed oil, sunflower oil, canola oil, corn oil or combinations thereof.

6. The composition of claim 5, wherein the bio-based oils comprise epoxidized soybean oil having an oxirane value ranging from 6-9%.

7. The composition of claim 1, wherein the blend comprises fatty acid esters and bio-based oils in a weight ratio ranging from 90:10 to 10:90.

8. The composition of claim 7, wherein the fatty acid esters and the bio-based oils are present in a 50:50 weight ratio.

9. The composition of claim 1, wherein the composition is free of alkaline metals chosen from sodium, calcium and magnesium ions.

10. The composition of claim 1, wherein the composition is free of hydroxy acetate.

11. The composition of claim 1, wherein the composition exhibits iodine value ranging from 1 to 3.

12. The composition of claim 1, wherein the fatty acid esters and the bio-based oil are unepoxidized prior to forming the blend.

13. The composition of claim 1, wherein the fatty acid esters and the bio-based oil are epoxidized prior to forming the blend.

14. A method of making a phthalate-free, epoxidized plasticizer composition comprising:
   forming a blend of one or more fatty acid esters having less than 10% saturates, and one or more bio-based oil having an oxirane value of at least 5%,
   wherein the one or more fatty acid esters and the bio-based oils are epoxidized either prior to forming the blend or in a single epoxidation step after the blend is formed.

15. The method of claim 14, wherein the fatty acid esters have less than 8% saturates and are derived from one or more vegetable oils.

16. The method of claim 15, wherein the fatty acid esters comprises methyl ester derived from high linoleic soy bean oil, methyl ester derived from low saturated soy bean oil, high oleic methyl ester canola oil, or combinations thereof.

17. The method of claim 16, wherein the fatty acid esters comprise soy methyl ester, canola methyl ester, or combinations thereof.

18. The method of claim 14, wherein the bio-based oil have an oxirane value ranging from 6-9%.

19. The method of claim 14, wherein the bio-based oils comprise vegetable oils chosen from soybean oil, olive oil, peanut oil, cottonseed oil, linseed oil, sunflower oil, canola oil, corn oil, camalina oil, algal oil or combinations thereof.

20. The method of claim 14, wherein the one or more fatty acid esters act as a solvent for the one or more bio-based oils during the epoxidation step.

21. The method of claim 14, further comprises adding formic acid to the blend and allowing the reaction to proceed until a desired iodine value is achieved.

22. The method of claim 21, wherein the desired iodine value ranges from 1 to 3.

23. A plasticized polymer composition comprising one or more polymers and at least one plasticizer homogeneously dispersed within the polymer composition, wherein the plasticizer is phthalate-free and comprising a blend of:
 a) one or more fatty acid esters having less than 10% saturates; and
 b) one or more bio-based oil having an oxirane value of at least 5%.

24. The plasticized polymer composition of claim 23, wherein the polymers comprise one or more polymers chosen from halogenated polymers, acid-functionalized polymers, anhydride-functionalized polymers, and nitrile rubbers.

25. The plasticized polymer composition of claim 24, wherein the polymer is a polyvinyl chloride polymer (PVC) chosen from PVC homopolymers, PVC copolymers, polyvinyl dichlorides (PVDC), and polymers of vinylchloride with vinyl, acrylic and other co-monomers.

26. The plasticized polymer composition of claim 23, wherein the polymers comprise one or more bio-polymers chosen from polylactic acid, polyhydroxy butyrate, polyamide 11 or mixtures thereof.

27. The plasticized polymer composition of claim 23, wherein the plasticizer is present in the polymer composition in an amount of from 1 weight percent to 40 weight percent, based on the total amount of polymer.

28. The plasticized polymer composition of claim 23, further comprising one or more adjuvants chosen from one or more fillers, pigments, flame retardants, dyes, stabilizers, UV stabilizers, lubricants, surfactants, flow aids, plasticizers or combinations thereof.

* * * * *